United States Patent
Yavatkar et al.

(10) Patent No.: US 7,260,106 B2
(45) Date of Patent: Aug. 21, 2007

(54) METHOD AND APPARATUS FOR MANAGING ENERGY USAGE OF PROCESSORS WHILE EXECUTING PROTOCOL STATE MACHINES

(75) Inventors: Rajendra Yavatkar, Portland, OR (US); Lakshman Krishnamurthy, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 968 days.

(21) Appl. No.: 10/056,160

(22) Filed: Jan. 24, 2002

(65) Prior Publication Data

US 2003/0137945 A1 Jul. 24, 2003

(51) Int. Cl.
- *H04L 12/54* (2006.01)
- *H04L 12/26* (2006.01)
- *G06F 1/26* (2006.01)
- *G08B 5/22* (2006.01)
- *H04B 1/04* (2006.01)

(52) U.S. Cl. ............... 370/428; 370/252; 713/300; 713/322; 340/7.33; 455/127.5

(58) Field of Classification Search ............... None
See application file for complete search history.

(56) References Cited

U.S. PATENT DOCUMENTS

| | | | | |
|---|---|---|---|---|
| 5,978,849 A * | 11/1999 | Khanna | | 709/227 |
| 6,034,963 A * | 3/2000 | Minami et al. | | 370/401 |
| 6,049,882 A * | 4/2000 | Paver | | 713/322 |
| 6,427,173 B1 * | 7/2002 | Boucher et al. | | 709/238 |
| 6,487,264 B1 * | 11/2002 | Alley et al. | | 375/361 |
| 6,594,701 B1 * | 7/2003 | Forin | | 709/232 |
| 6,714,516 B1 * | 3/2004 | Todd | | 370/235 |
| 6,876,835 B1 * | 4/2005 | Marko et al. | | 455/3.06 |
| 2003/0126551 A1 * | 7/2003 | Mantha et al. | | 714/790 |

\* cited by examiner

*Primary Examiner*—Steven Nguyen
(74) *Attorney, Agent, or Firm*—Pillsbury Winthrop Shaw Pittman LLP

(57) ABSTRACT

A method and apparatus of implementing protocol state machines that conserve energy on energy conscious devices is disclosed. Under this method, most of the energy consuming protocol state machine context invocations or operations are aggregated in time and are scheduled at regular intervals. Such an aggregation leads to many contexts executing concurrently in a burst prior to entering a dormant state. Thus, resource usage can reach a predictable rate pattern of idle and active cycles. With such a pattern, it is possible to take advantage of the energy saving features of processors by downshifting the processor clock speed and use of other resources such as peripherals and buses. The intervals are configured to achieve a tradeoff between timely execution and energy consumption. The aggregation operates across two dimensions, namely, multiple instances of a protocol state machine and multiple layers of protocols in a layered architecture.

20 Claims, 4 Drawing Sheets

METHOD AND APPARATUS FOR MANAGING ENERGY USAGE OF PROCESSORS WHILE EXECUTING PROTOCOL STATE MACHINES

BACKGROUND

1. Field of the Invention

Embodiments described herein are directed to a system for managing energy usage of processors while executing protocol state machines. Specifically, an alternate method of implementing protocol state machines that conserves energy on energy conscious devices is described.

2. Related Art

Protocol state machines typically represent communication protocol implementations. The actual implementation creates an instance of the state machine in a programming language such as assembler or C, for example. In addition, a protocol may involve communication between two entities such as two ends of a transport-level connection or two application level processes. In such a case, there must be multiple instances of the protocol state machine instantiated to handle separately the state and traffic involving each pair of separate entities engaged in the protocol-based communication.

Each such instance represents a separate and independent context and may have resources such as buffers, timers, etc. When a packet for the protocol is received, the context for the packet is identified; the corresponding instance of the protocol state machine is invoked; the instance executes the relevant part of the protocol state machine and returns to a dormant state until invoked again. On the transmission end, a separate instance of the protocol state machine handles each context. When invoked, the protocol state machine handles transmission of packets by performing necessary actions such as buffer management, setting a timer if the transmission needs to be scheduled for a later time, and invoking the underlying protocol layer or physical hardware to complete the transmission. The transmit portion of the protocol may become dormant again.

Many parts of the protocol state machine require use of resources such as CPU cycles, memory, and timers. For instance, CPU cycles are necessary for execution of protocol state machine code or associated actions. Memory is needed for copying buffers and adding or modifying headers to packets. A timer may be set to schedule a transmission or retransmission, meter incoming traffic, or detect communication problems.

Typically, communication architectures are layered in two or more layers with a separate protocol handling the communication between peer entities at each layer. Traditional protocol state machine implementations use single or multiple threads to represent and execute multiple contexts that represent multiple instances of a protocol state machine. At any time, a myriad of such instances may execute depending on the number of protocol layers and the number of concurrently communicating entities on a given machine.

Each of these instances uses the resources that it needs at any given time, depending on the incoming or outgoing traffic. Therefore, a snapshot over any interval shows frequent use of resources at irregular intervals followed by intervening idle or dormant periods. This does not pose any particular problem on a conventional machine. Such a frequent but irregular use of resources, however, can cause a significant drain of energy on a new class of devices such as handheld computers, wireless devices, or embedded devices. Power is a critical resource on such devices. Each time that a timer goes off or memory is accessed, additional energy consumption is required. In addition, frequent cycles of dormant versus active states at irregular intervals interfere with the power management schemes used on such devices that attempt to conserve energy by "turning down" unused resources during idle times. As such, an alternate method of implementing protocol state machines that will conserve energy on energy conscious devices is necessary. That is, an incremental method of distributing energy usage away from disruptive and irregular patterns to a more predictable and cooperative pattern that can be exploited to reduce overall energy usage would prove advantageous.

BRIEF DESCRIPTION OF THE DRAWINGS

A detailed description of embodiments of the invention will be made with reference to the accompanying drawings, wherein like numerals designate corresponding parts in the several figures.

DETAILED DESCRIPTION

The following paragraphs describe a method and apparatus for managing and conserving energy usage of processors on energy conscious devices while executing protocol state machines. Under this method, most of the energy consuming protocol state machine instance/context invocations or operations are aggregated in time and are scheduled at regular intervals. Such an aggregation leads to multiple instances or contexts executing concurrently in a burst before entering a dormant state. Therefore, resource usage can reach a predictable pattern of idle and active cycles.

With such a pattern, it is possible to take advantage of the energy saving features of processors by downshifting processor clock speed and use of other resources such as peripherals and buses. The intervals are configured to achieve a tradeoff between timely execution and energy consumption. The aggregation operates across two dimensions, namely, across multiple instances of a protocol state machine and across multiple layers of protocols in a layered architecture.

Figure 1:
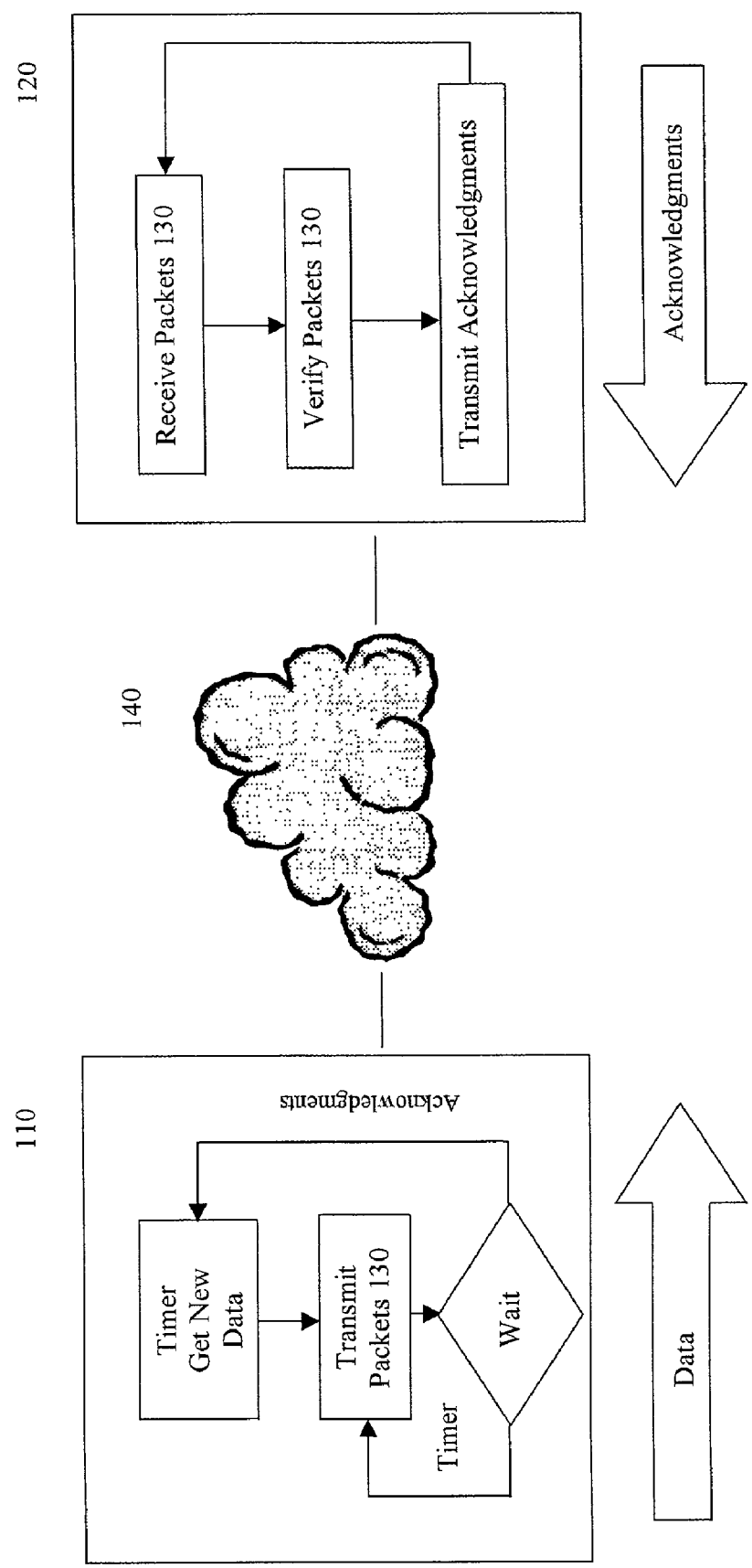
FIG. 1 is a block diagram that illustrates management of energy usage for one transmitting protocol state machine and one receiving protocol state machine, according to an embodiment of the present invention.

FIG. 1 illustrates a single instance of managing energy usage by implementing a single protocol state machine. That is, one transmitter protocol state machine 110 and one receiver protocol state machine 120 are employed. The transmit protocol state machine 110 is tasked with sending a set of packets 130 to another host over a data communication network 140. The data communication network 140 may be the Internet, an intranet, or any other kind of public, private, or other data communication network. Packets 130 are pieces of information or data that is divided into segments. The transmit protocol state machine 110 then waits for these packets 130 to be acknowledged by the receiving protocol state machine 120 before transmitting the next set of packets 130. This is a typical algorithm for the reliable transport of packets 130 over an unreliable data communication network 140.

Figure 3:
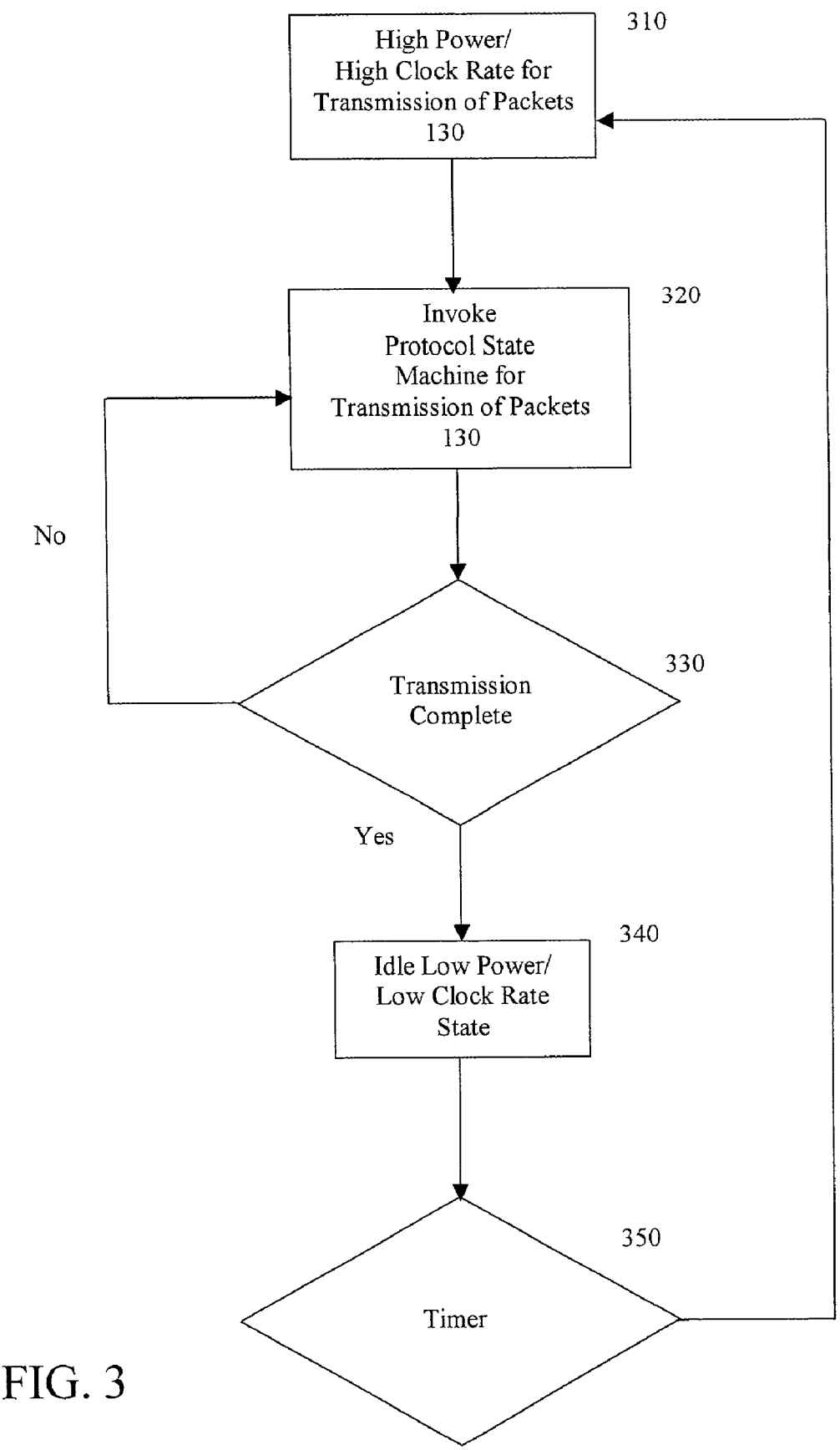
FIG. 3 is a flow chart that illustrates the actions taken by a transmitter protocol state machine in the overall system of managing energy usage of processors, according to an embodiment of the present invention.

The transmitter begins in a high powered, high clock rate mode. High means greater than low. This is illustrated as operation 310 in FIG. 3. As shown in operation 320, the transmitter then invokes the protocol state machine 110 to transmit packets 130 periodically. Starting with raw data, the transmit protocol state machine 110 performs tasks to create packets 130 for transmission, such as dividing the raw data into packets 130, adding protocol headers, and computing checksums. The transmit protocol state machine 110 sends these packets 130, as shown in operation 330, and waits for acknowledgments from the receiver protocol state machine 120. While waiting, the transmitter protocol state machine 110 switches into a low power, low clock rate mode, as illustrated in operation 340. While waiting, the transmitter protocol state machine 110 does not wake up to handle every incoming acknowledgment. Instead, it wakes up only when a timer sounds or when an incoming packet buffer reaches a low water mark, as shown in operation 350. The transmitter then prepares for the sending of additional packets 130.

Figure 4:
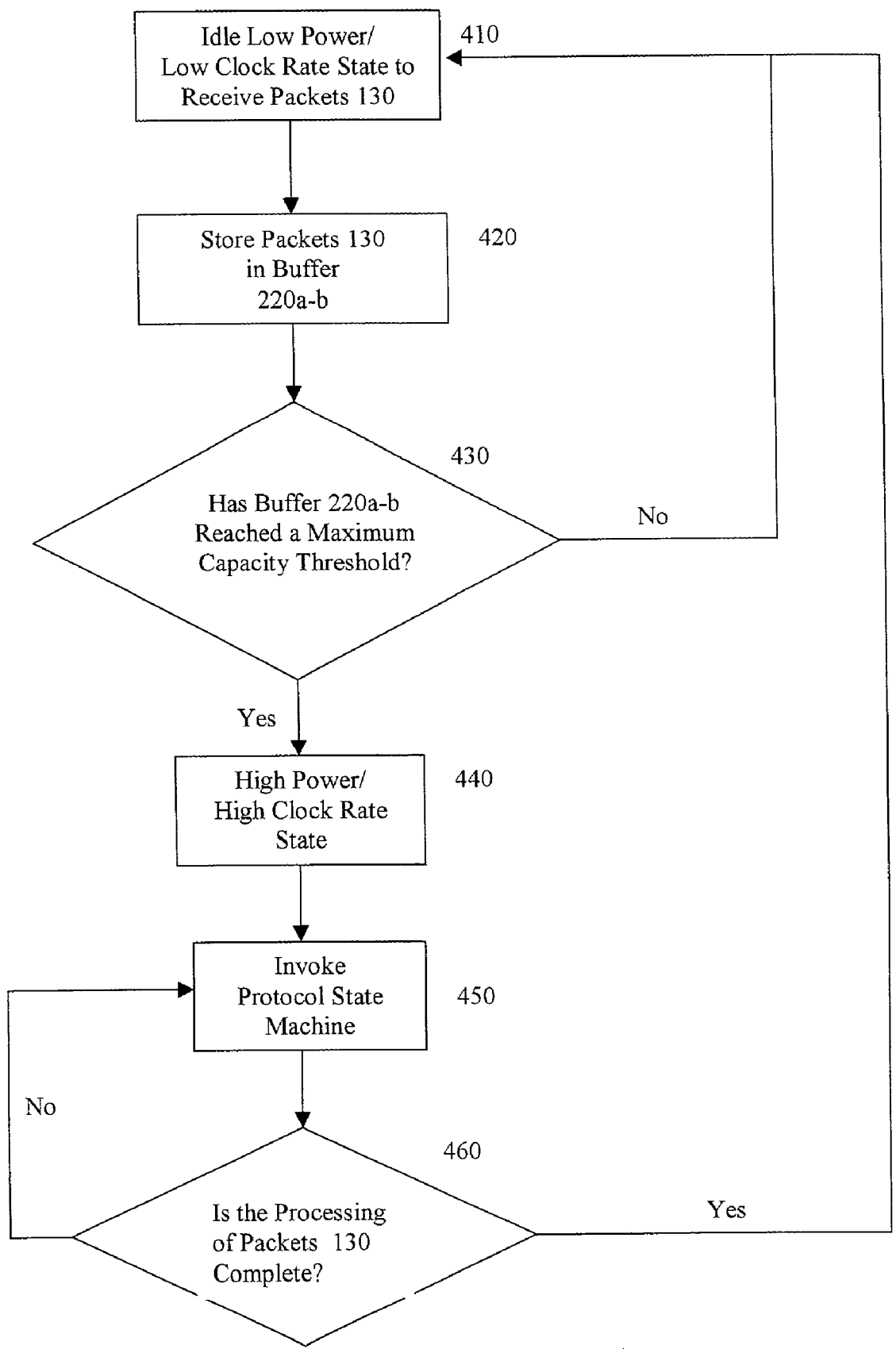
FIG. 4 is a flow chart that illustrates the actions taken by a receiver protocol state machine in the overall system of managing energy usage of processors, according to an embodiment of the present invention.

The receiver protocol state machine 120, in contrast, starts in a low power, low clock rate mode, as shown in operation 410 of FIG. 4. When packets 130 are received from the data communication network 140, they are simply buffered, as illustrated in operation 420. Operation 430 examines whether a buffer has reached a maximum capacity or a high water mark. If such a threshold has not been reached, the receiver protocol state machine 120 returns to operation 410. When the buffer is full or reaches a high water mark, the receiver protocol state machine 120 is invoked, as illustrated in operation 450, after switching to a higher powered, higher clock rate mode, as shown in operation 440. In this scenario, the frequency and power level of the processor is driven by the received or transmitted data. The packets 130 are processed by the receiver protocol state machine 120, and acknowledgments are sent to the transmitter protocol state machine 110, if required by the state machine. When the processing of packets 130 is complete, the receiver protocol state machine 120 returns to an idle state, as depicted in operation 410. The use of buffers and timers in both the transmitter protocol state machine 110 and the receiver protocol state machine 120 results in periodic patterns in data reception and transmission. The periodicity may then be used to manage the power and frequency settings of the host processor.

Figure 2:
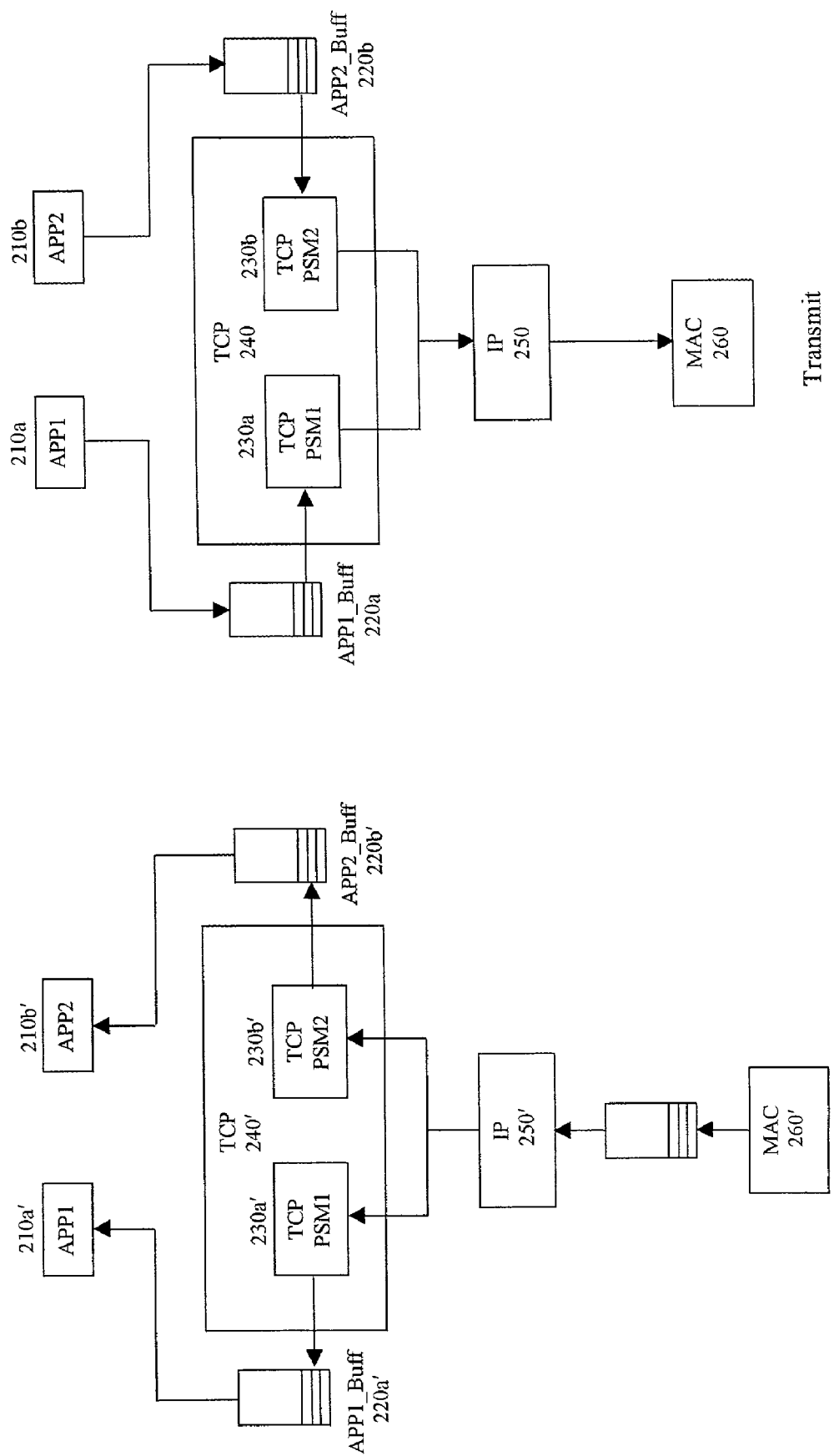
FIG. 2 is a block diagram that illustrates management of energy usage for a multiple protocol layer/multiple protocol state machine scenario, according to an embodiment of the present invention.

FIG. 2 illustrates an instance of managing energy usage in the multiple protocol layer, multiple protocol state machine scenario. Transmission Control Protocol ("TCP") 240 (shown also as 240') [Transmission Control Protocol, Request For Comments ("RFC") 793, published September 1981] and Internet Protocol ("IP") 250 (shown also as 250') [Internet Protocol, Request For Comments ("RFC") 791, published September 1981] are used only as examples, for the technique may be applied to other transmission protocols and other scenarios. TCP 240 is an agreed upon format for transmitting data between two devices. TCP 240 provides end-to-end, connection-oriented, reliable transport layer (layer 4) functions over IP 250 controlled networks. Typically, TCP 240 performs flow control between two systems, acknowledgments of packets received, and end-to-end sequencing of packets. IP 250 operates in conjunction with TCP 240 and is usually identified as TCP/IP. IP 250 is a connectionless protocol that operates at network layer (layer 3) of the Open System Interconnection ("OSI") model, a seven layer architecture model for the interconnection of data communications systems [Open Systems Interconnection model, ISO/IEC 7498, published 1994]. Each layer uses and builds on services provided by those below it. The OSI model creates an open systems networking environment where different systems can share data regardless of vendor or platform.

Similar to the previous instance, the receiver TCP protocol state machines 230a and 230b (pictured also as 230a' and 230b') begin in the low power, low clock rate mode. In this state, packets 130 received from the data communication network 140 are buffered. When this buffer is full or reaches a threshold, the host switches to a higher clock rate, higher power mode. The Internet Protocol 250 layer is then invoked and processes the buffered packets 130. These packets 130 are demultiplexed and delivered to separate instances of TCP protocol state machines 230a and 230b. Each TCP protocol state machine 230a and 230b maintains the state of a unique end-to-end connection. The TCP protocol state machines 230a and 230b process the packets 130 and store the raw bit stream in application provided buffers, namely APP1_buff 220a (shown also as 220a') and APP2_buff 220b (pictured also as 220b'). Two application buffers are shown for illustration purposes only. In reality, a great many application buffers may be employed. When the total number of packets 130 in all application buffers reaches a threshold or when an application buffer reaches capacity, the processor is switched to a different clock mode and power level to execute application code. This mode may be higher or lower depending on the application's requirements.

The transmitter starts by running at an appropriate clock rate for the particular application, APP1 210a (also 210a') or APP2 210b (also 210b'). APP1 210a and APP2 210b fill APP1_buff 220a and APP2_buff 220b, respectively. When either buffer 220a or 220b is full or when there is sufficient data in all of the buffers 220a–b, the applications are blocked, and the TCP protocol state machines 230a and 230b are invoked to process the data in the buffers 220a and 220b. The transmitter switches the processor clock and power mode to an appropriate one for TCP 240 processing. The TCP protocol state machines 230a and 230b process the data and pass packets 130 to the IP 250 and Media Access Control ("MAC") 260 (shown also as 260') layers. The MAC 260 layer transmits the data into the data communication network 140. The MAC 260 layer operates at the data link layer (layer 2) that defines topology dependent access control protocols for local area network specifications.

While the above description refers to particular embodiments of the present invention, it will be understood to those of ordinary skill in the art that modifications may be made without departing from the spirit thereof. The accompanying claims are intended to cover any such modifications as would fall within the true scope and spirit of the embodiments of the present invention.

The presently disclosed embodiments are therefore to be considered in all respects as illustrative and not restrictive; the scope of the embodiments of the invention being indicated by the appended claims, rather than the foregoing description. All changes that come within the meaning and range of equivalency of the claims are therefore intended to be embraced therein.

What is claimed is:

1. A system to manage energy usage of a processor, comprising:
   a data communication network;
   a transmitter, coupled to the data communication network, to invoke a protocol state machine to send a packet and to wait for an acknowledgment of receipt;
   a receiver, in communication with the transmitter coupled to the data communication network, to receive, process, and verify the packet and to send the acknowledgment of receipt of the packet;
   an incoming packet buffer, coupled to the protocol state machine in the transmitter, to store an incoming packet to be transmitted by the transmitter; and
   a processor, coupled to the protocol state machine in the transmitter, the processor enters a low power, low clock rate mode while waiting for the acknowledgment of receipt of the packet from the receiver,
   wherein the protocol state machine manages a power level of the processor based on a utilized capacity of the buffer and the transmitter awakens when the incoming packet buffer reaches a low water mark.

2. The system of claim 1, wherein the data communication network includes at least one of the Internet and an Intranet.

3. The system of claim 1, wherein the processor in the transmitter begins in a high power, high clock rate mode.

4. The system of claim 1, wherein the transmitter performs tasks to create packets for transmission, the tasks including at least one of dividing data into packets, adding protocol headers, or computing checksums.

5. The system of claim 1, wherein the receiver includes an application buffer and after the receiver receives the packet, the packet is stored in the application buffer.

6. The system of claim 5, wherein the receiver includes a receiver protocol state machine and a receiver processor, and the receiver protocol state machine manages a power level of the receiver processor based on a utilized capacity of the application buffer.

7. The system of claim 6, wherein the receiver processor begins in a low power, low clock rate mode.

8. The system of claim 6, wherein the receiver processor enters a high power, high clock rate mode when the application buffer reaches a maximum capacity.

9. An article comprising:
   a computer-readable storage medium having stored thereon instructions that when executed by a computer result in the following:
   receiving a data packet at a receiver protocol state machine, the data packet being transmitted from a transmitter protocol state machine over a data communication network;
   depositing the data packet in an application buffer;
   processing and verifying the data packet; and
   transmitting an acknowledgment of receipt of the data packet to the transmitter protocol state machine, wherein the receiver protocol state machine manages a power level of a processor in the receiver which is coupled to the receiver protocol state machine based on a utilized capacity of the application buffer, the processor in the receiver switching to a high-power, high clock rate mode from a lower power, low clock rate mode when the application buffer reaches a threshold.

10. The article of claim 9, wherein the utilized capacity of the application buffer and a timer cause periodic patterns in data packet reception, which are used to manage power and frequency of a processor in a transmitting device.

11. The article of claim 9, wherein the data communication network includes at least one of the Internet and an Intranet.

12. An article comprising:
   a computer-readable storage medium having stored thereon instructions that when executed by a computer result in the following:
   receiving a data packet at a receiver protocol state machine, the data packet being transmitted from a transmitter protocol state machine over a data communication network;
   depositing the data packet in an application buffer;
   processing and verifying the data packet; and
   transmitting an acknowledgment of receipt of the data packet to the transmitter protocol state machine, wherein the receiver protocol state machine manages a power level of a processor coupled to the receiver protocol state machine based on a utilized capacity of the application buffer, and a processor in the receiver enters a high power, high clock rate mode when the application buffer reaches a maximum capacity and the processor in the receiver enters an idle low power, low clock rate mode after the application buffer has reached the maximum capacity and the receiver protocol state machine has processed packets residing in the application buffer.

13. A receiver for managing energy usage of a processor in the receiver, comprising:
   a protocol state machine to receive a packet from a transmitter over a data communication network and to process and verify the packet;
   a processor coupled to the protocol state machine; and
   an application buffer coupled to the protocol state machine to store the packet,
   wherein the protocol state machine transmits and acknowledgment of receipt of the date packet to the transmitter, the protocol state machine manages a power level of the processor in the receiver based on a utilized capacity of the application buffer, the processor in the receiver switching to a high-power, high clock rate mode from a low power, low clock rate mode when the application buffer reaches a threshold.

14. The receiver of claim 13, wherein the application buffer and a timer cause periodic patterns in data packet receition, which are used to manage power and frequency of a processor in a transmitting device.

15. A receiver for managing energy usage of a processor, comprising:
   a protocol state machine to receive a packet from a transmitter over a data communication network and to process and verify the packet;
   a processor coupled to the receiver protocol state machine; and
   an application buffer coupled to the protocol state machine to store the packet,
   wherein the protocol state machine transmits an acknowledgment of receipt of the data packet to the transmitter and the protocol state machine manages a power level of the processor based on a utilized capacity of the application buffer and wherein the processor enters an idle low power, low clock rate mode after the application buffer has reached the maximum capacity and the receiver protocol state machine has processed packets residing in the application buffer.

16. A method of managing energy usage of a processor in a receiver, comprising:

receiving a data packet at a receiver protocol state machine, the data packet being transmitted from a transmitter protocol state machine over a data communication network;

depositing the data packet in an application buffer;

processing and verifying the data packet; and transmitting an acknowledgment of receipt of the data packet to the transmitter protocol state machine, wherein the receiver protocol state machine manages the a power level of the processor in the receiver which is coupled to the receiver protocol state machine, based on a utilized capacity of the application buffer, the processor in the receiver switching to a high-power, high clock rate mode from a low power, low clock rate mode when the application buffer reaches a threshold.

17. The method of claim 16, wherein the application buffer and a timer cause periodic patterns in data packet reception, which are used to manage power and frequency of a processor in a transmitting device.

18. The method of claim 16, wherein the data communication network includes at least one of the Internet and an Intranet.

19. A method of managing energy usage of a processor in a receiver, comprising:

receiving a data packet at a receiver protocol state machine, the data packet being transmitted from a transmitter protocol state machine over a data communication network;

depositing the data packet in an application buffer;

processing and verifying the data packet; and transmitting an acknowledgment of receipt of the data packet to the transmitter protocol state machine, wherein the receiver protocol state machine manages the a power level of the processor based on a utilized capacity of the application buffer, the processor enters a high power, high clock rate mode when the application buffer reaches a maximum capacity, and the processor enters an idle low power, low clock rate mode after the application buffer has reached the maximum capacity and the receiver protocol state machine has processed packets residing in the application buffer.

20. A method of managing energy usage of a processor in a transmitting device, comprising:

invoking a protocol state machine to send a packet across a data communication network to a receiver and waiting for an acknowledgment of receipt;

storing incoming packets that are to transmitted by the protocol state machine to the receiver in a buffer;

managing a power level of the processor in the transmitting device based on a utilized capacity of the buffer;

transmitting any of the packets in the buffer until the utilized capacity of the buffer reaches the threshold; and switching the power level of the processor to a low power, low rate clock mode after the packets in the buffer have been transmitted.

* * * * *